United States Patent
Echevarria Benito et al.

(10) Patent No.: US 11,945,225 B2
(45) Date of Patent: Apr. 2, 2024

(54) DETERMINING PRINTING FLUID AMOUNTS

(71) Applicant: HEWLETT-PACKARD DEVELOPMENT COMPANY, L.P., Spring, TX (US)

(72) Inventors: Sara Echevarria Benito, Sant Cugat del Valles (ES); Ruben Recasens Oros, Sant Cugat del Valles (ES); Alexandre Rodriguez Llofriu, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 129 days.

(21) Appl. No.: 17/778,359

(22) PCT Filed: Nov. 22, 2019

(86) PCT No.: PCT/US2019/062785
§ 371 (c)(1),
(2) Date: May 19, 2022

(87) PCT Pub. No.: WO2021/101567
PCT Pub. Date: May 27, 2021

(65) Prior Publication Data
US 2023/0023168 A1 Jan. 26, 2023

(51) Int. Cl.
*B41J 2/21* (2006.01)
*B41J 2/17* (2006.01)
*H04N 1/405* (2006.01)

(52) U.S. Cl.
CPC ............. *B41J 2/17* (2013.01); *B41J 2/2114* (2013.01); *H04N 1/405* (2013.01)

(58) Field of Classification Search
CPC .............................. B41J 2/2114; H04N 1/405
See application file for complete search history.

(56) References Cited

U.S. PATENT DOCUMENTS 6,457,806 B2 * 10/2002 Hickman ............... B41J 2/2132
347/40
6,902,252 B1   6/2005 Torgerson et al.
(Continued)

FOREIGN PATENT DOCUMENTS

| CN | 108116054 A | * | 6/2018 | .......... B41J 11/0015 |
| EP | 3210789 B1 | * | 9/2019 | ............... B41J 2/01 |
| WO | WO-2017154580 A1 | * | 9/2017 | .......... B41J 11/0015 |

OTHER PUBLICATIONS

Sasaki, Machine TranslationofEP-3210789-B1,2019 (Year: 2019).*
(Continued)

*Primary Examiner* — Scott A Richmond (57) ABSTRACT

A method is disclosed. The method comprises receiving a matrix representation of a source image to be printed, the matrix representation defining a colorant value for each of a plurality of print addressable locations, wherein the colorant values are representative of amounts of print colorant to be delivered to the print addressable locations during a printing operation. The method may comprise identifying, by processing circuitry, a region in the matrix representation having a first print addressable location and an adjacent second print addressable location, wherein a difference between colorant values of the first print addressable location and the second print addressable location meets or exceeds a defined colorant value threshold. The method may comprise determining, by processing circuitry, an amount of treatment fluid to be delivered to each of the plurality of print addressable locations during the printing operation, wherein an amount of treatment fluid to be delivered in the identified region is determined to be greater than an amount of treatment fluid (Continued)

to be delivered to adjacent print addressable locations having colorant values which differ by less than the defined colorant value threshold. An apparatus and a machine-readable medium are also disclosed.

15 Claims, 9 Drawing Sheets

(56) References Cited

U.S. PATENT DOCUMENTS

| | | |
|---|---|---|
| 7,357,472 B2 | 4/2008 | Yamanobe |
| 7,465,005 B2 | 12/2008 | Walmsley et al. |
| 7,645,019 B2 | 1/2010 | Hirakawa |
| 8,426,495 B2 | 4/2013 | Morimoto |
| 8,454,152 B2 | 6/2013 | Kobayashi et al. |
| 9,738,101 B2 | 8/2017 | Matsumoto et al. |
| 10,022,965 B2 | 7/2018 | DeJoseph et al. |

OTHER PUBLICATIONS

Kondo, MachineTranslationofCN-108116054-A, 2018 (Year: 2018).*
Katagami, MachineTranslationofWO-2017154580-A1, 2017 (Year: 2017).*

* cited by examiner

| 0 | 0 | 6 | 152.4 | 0 | 0 |
| 15 | 40.8 | 34.8 | 152.4 | 0 | 0 |
| 30 | 15 | 12 | 152.4 | 0 | 0 |
| 0 | 132 | 18 | 152.4 | 93.6 | 0 |
| 0 | 153 | 152.4 | 152.4 | 74.4 | 15 |
| 0 | 0 | 0 | 0 | 87 | 36 |

| 0 | 0 | 48 | 1219.2 | 0 | 0 |
| 120 | 326.4 | 278.4 | 1219.2 | 0 | 0 |
| 240 | 120 | 96 | 1219.2 | 0 | 0 |
| 0 | 1056 | 144 | 1219.2 | 748.8 | 0 |
| 0 | 1224 | 1219.2 | 1219.2 | 595.2 | 120 |
| 0 | 0 | 0 | 0 | 696 | 288 |

DETERMINING PRINTING FLUID AMOUNTS

BACKGROUND

In some printing systems, print agent, such as a colorant, may be deposited onto a printable substrate, at various locations in accordance with data representing an image to be printed. During a printing operation, different amounts of print agent may be deposited at different locations. Sometimes, where a relatively large amount of print agent is deposited at a location (e.g. a region of high print agent saturation) adjacent to or near to a location where a relatively smaller amount of print agent has been deposited (e.g. a region of low print agent saturation), print agent may move from the high saturation region to the low saturation region in a process sometimes referred to as bleeding.

The effects of bleeding in a printed image may lead to the occurrence of a visible print quality defect, resulting in blurring in the image.

BRIEF DESCRIPTION OF DRAWINGS

Examples will now be described, by way of non-limiting example, with reference to the accompanying drawings, in which.

DETAILED DESCRIPTION

Print agent bleed or bleeding (movement of print agent within a printed image, from a region of relatively higher print agent saturation to a region of relatively lower print agent saturation either during or after a printing operation) can lead to quality defects wherein parts of the printed image do not appear as intended.

Examples described herein provide a mechanism by which a printing operation may be planned so as to reduce the occurrence and effects of print agent bleed. Specifically, disclosed examples provide a mechanism by which printing fluid, such as print agent fixer, or treatment fluid, can be selectively deposited based on the positions at which it is intended to deposit colorant print agent.

The effects of print agent bleed may occur more frequently in scanning print apparatuses than other types of print apparatus. However, such occurrences may occur as a result of print operations performed using many other types of print apparatus, and printing technologies. Therefore, it will be understood that the methods and apparatus as described herein may be applied to any type of printing technology.

According to the present disclosure, techniques may be performed prior to the printing process, once a continuous tone, or con-tone, representation of a source image (i.e. an image to be printed) has been converted into a half-tone representation. A half-tone representation, or a half-tone image, may be considered to be a matrix of pixels, each of which is capable of being printed by the printing system. Thus, each pixel may correspond to, or may be referred to as a print addressable location. Each cell of the half-tone matrix may include an indication of the nature of, and amount of, a print agent to be delivered to a corresponding print addressable location during a printing operation to form the image.

A print addressable location may be represented by a pixel or by multiple pixels, and each print addressable location may be printed with a colorant, or multiple colorants, such as inks (for example cyan, magenta, yellow and black inks). As used herein, the terms colorant and ink are intended to refer to print agent which is used to apply color to a printable substrate. A print addressable location may also, or alternatively, be printed with another printing agent, such as a fixer, a binder, an overcoat or coating, a pre-treatment, a gloss enhancer, a spot gloss, and the like. The additional printing agent (also referred to herein as extra print agent, treatment fluid, printing fluid and ink treatment fluid) may be considered to comprise a printing agent that is not a colorant. The additional printing agent may, for example, reduce the likelihood of print defect occurring with regard to the colorant. For example, the additional printing agent may reduce the likelihood that colorant moves (e.g. bleeds) from a region of relatively high colorant saturation to a region of relatively lower colorant saturation.

Figure 1:
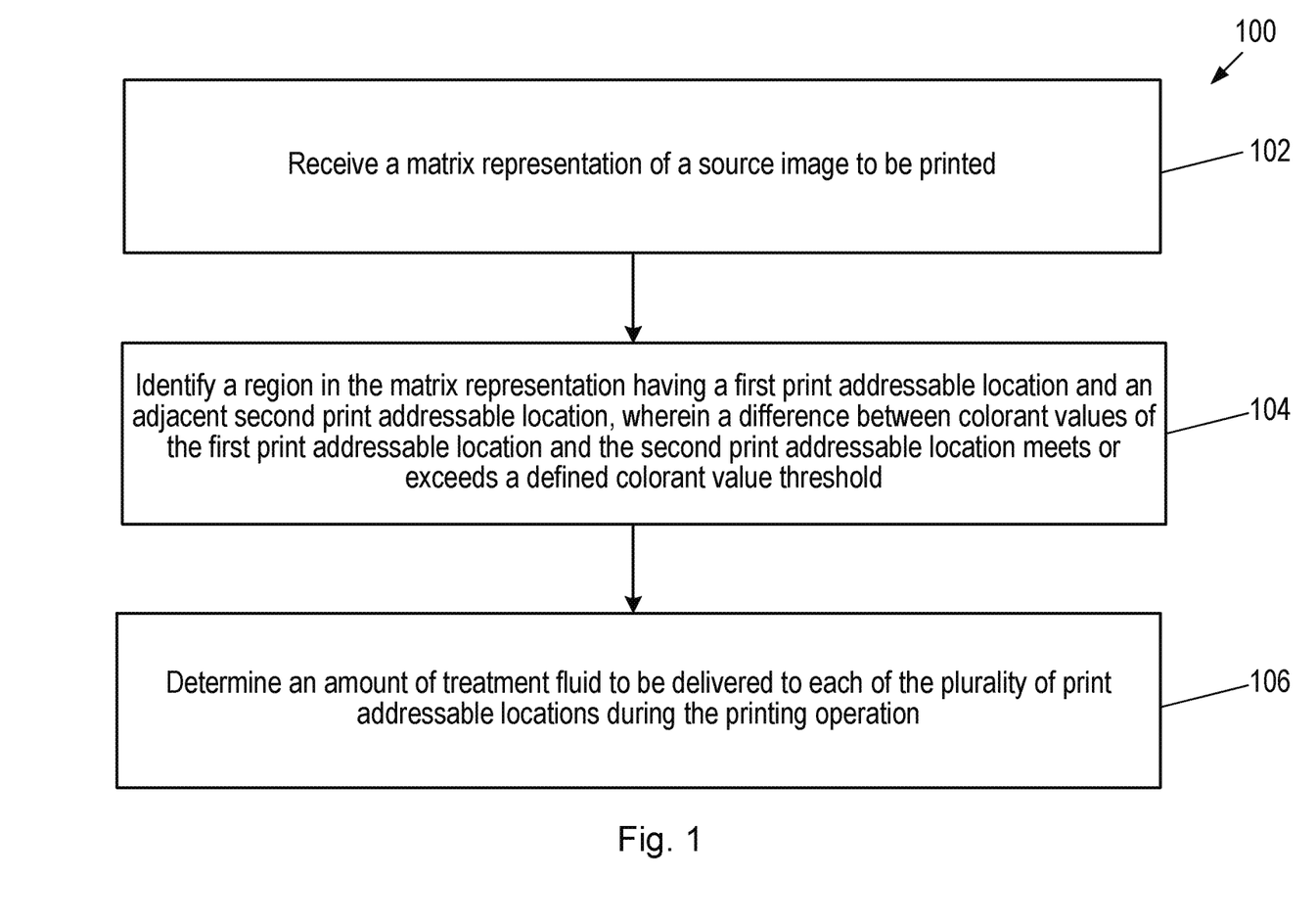
FIG. 1 is a flowchart of an example of a method of determining printing fluid amounts.

Referring to the drawings, FIG. 1 is a flowchart of an example of a method 100, which may be a computer-implemented method of determining print agent amounts, or of determining treatment fluid amounts. The method may be carried out by a processor or by multiple processors. The method 100 comprises, at block 102, receiving a matrix representation of a source image to be printed. The matrix representation may define a colorant value for each of a plurality of print addressable locations. The colorant values are representative of amounts of print colorant to be delivered to the print addressable locations during a printing operation. The matrix representation may, in some examples, define colorant values for just one print colorant, such that a separate matrix representation is received in respect of each different print colorant to be used during a printing operation. For example, for a printing operation using cyan, magenta, yellow and black colorants, four matrix representations may be received. Thus a separate matrix representation may be received for each colorant to be used. The combination of matrices for all colorants may form a combined matrix representation. In some examples, a matrix representation may be referred to as a plane. Thus, a matrix representation for a particular color/colorant may be referred to as a colorant plane (e.g. a C plane, an M plane, a Y plane and K plane for cyan, magenta, yellow and black colorants respectively), and multiple colorant planes may together define the amounts of print colorant to be delivered during the printing operation. The colorant planes may be used (along with other planes, as discussed below) by a print apparatus to determine where it is to deliver printing agent, and how much is to be delivered.

The received matrix representation provides an indication of the amount of a print colorant that is to be delivered at each print addressable location represented in the matrix for presentation. Thus, from a matrix representation, it is possible to identify those print addressable locations where a relatively large amount of print colorant is to be delivered (which may be referred to as a high saturation location) and those print addressable locations where a relatively small amount of print colorant is to be delivered (which may be referred to as a low saturation location). According to the present disclosure, print agent bleed may be prominent in regions where a high saturation location is near to or adjacent to a low saturation location.

Block 104 of the method 100 comprises identifying, by processing circuitry, a region in the matrix representation having a first print addressable location and an adjacent second print addressable location, wherein a difference between colorant values of the first print addressable location and the second print addressable location meets or exceeds a defined colorant value threshold. In other words, block 104 of the method 100 involves finding adjacent print addressable locations in the matrix representation whose respective colorant values differ by at least a defined colorant value threshold. The colorant of value threshold may be defined according to the intended result of the printing operation. For example, if it is intended to locate adjacent print addressable locations whose respective colorant values differ by a large amount (e.g. where there exists a very high colorant saturation region adjacent to a very low colorant saturation region), then the current value threshold may be set or defined accordingly (e.g. a large threshold may be defined).

The method 100 comprises, at block 106, determining, by processing circuitry, an amount of treatment fluid to be delivered to each of the plurality of print addressable locations during the printing operation, wherein an amount of treatment fluid to be delivered in the identified region is determined to be greater than an amount of treatment fluid to be delivered to adjacent print addressable locations having colorant values which differ by less than the defined colorant value threshold. Thus, within the region identified at block 104, where there exists adjacent print addressable locations having colorant values that differ by more than the defined colorant value threshold more treatment fluid is to be delivered during the printing operation than to adjacent print addressable locations having colorant values which do not differ by at least the defined colorant value threshold.

According to some examples, an amount of treatment fluid to be delivered to the adjacent print addressable locations (e.g. the first and second print addressable locations) having respective colorant values that differ by at least the defined colorant value threshold is greater than an amount of treatment fluid to be delivered to adjacent print addressable locations having colorant values that differ by less than the defined colorant value threshold. In some examples, an amount of treatment fluid to be delivered to the print addressable location in the identified region that has a relatively lower colorant value is greater than an amount of treatment fluid to be delivered to the print addressable location in the identified region that has a relatively higher colorant value. In other words, of the adjacent print addressable locations in the region identified at block 104, the location having the lower colorant value may, in some examples, be provided with more treatment fluid than the location having the higher colorant value. In this way, treatment fluid may restrict or prevent movement of colorant from the higher colorant saturation location to the lower colorant saturation location. In other examples, an amount of treatment fluid to be delivered to the print addressable location in the identified region that has a relatively lower colorant value is increased relative to an amount of treatment fluid that would normally be delivered (e.g. a normal or standard amount). For example, as described below, an amount of treatment fluid to be delivered may normally be based on the amount (e.g. a percentage) of colorant to be delivered. Thus, the amount of treatment fluid to be delivered to the print addressable location in the identified region that has a relatively lower colorant value may be more than the normal amount.

As noted above, the treatment fluid may, for example, comprise printing fluid that functions as a fixer, to limit spread or movement of colorant from a high saturation region to a low saturation region. Thus, in such identified regions, which are more susceptible to such movement (e.g. print agent bleed), the method arranges for more treatment fluid to be applied, to counteract the effect.

Figure 2A:
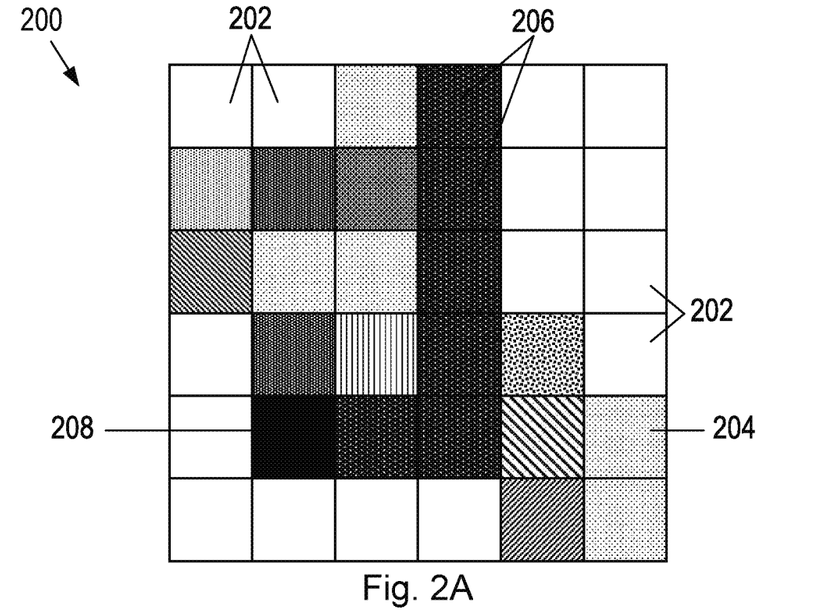
FIG. 2 is an illustration of various matrices showing various parts of the methods disclosed herein according to some examples.

Specific examples of the identifying (block 104) and the determining (at block 106) method 100 will now be described with reference to FIGS. 2 and 3, which are illustrations of various matrix representations. FIG. 2A shows an example of a matrix representation 200 having a plurality of cells, each representing a print addressable location. Each print addressable location may correspond to a pixel in a printed image. In the example shown, the matrix representation is a 6×6 matrix having 36 cells (e.g. point addressable locations). It will be understood, however, that the matrix representation may be of any size, and may represent the whole or a portion of an image to be printed. The matrix representation 200, in this example, represents a colorant amount for a particular colorant (e.g. cyan, magenta, yellow or black) that is to be delivered during a printing operation, and the difference levels of darkness (shown by varying degrees of shading) represent different colorant saturation levels. Thus, cells 202 that contain no shading represent print addressable locations where no colorant (of this particular color) is to be delivered; cells 204 that contain light shading represent print addressable locations where a small amount of the colorant is to be delivered; cells 206 contain medium shading represent print addressable locations where a relatively larger amount of the colorant is to be delivered; and cell 208 that contains dark shading represent a print addressable location where a large amount of the colorant is to be delivered. Other cells (not labelled) are shown with other degrees of shading, each representing a different amount of colorant to be delivered.

Figure 2B:
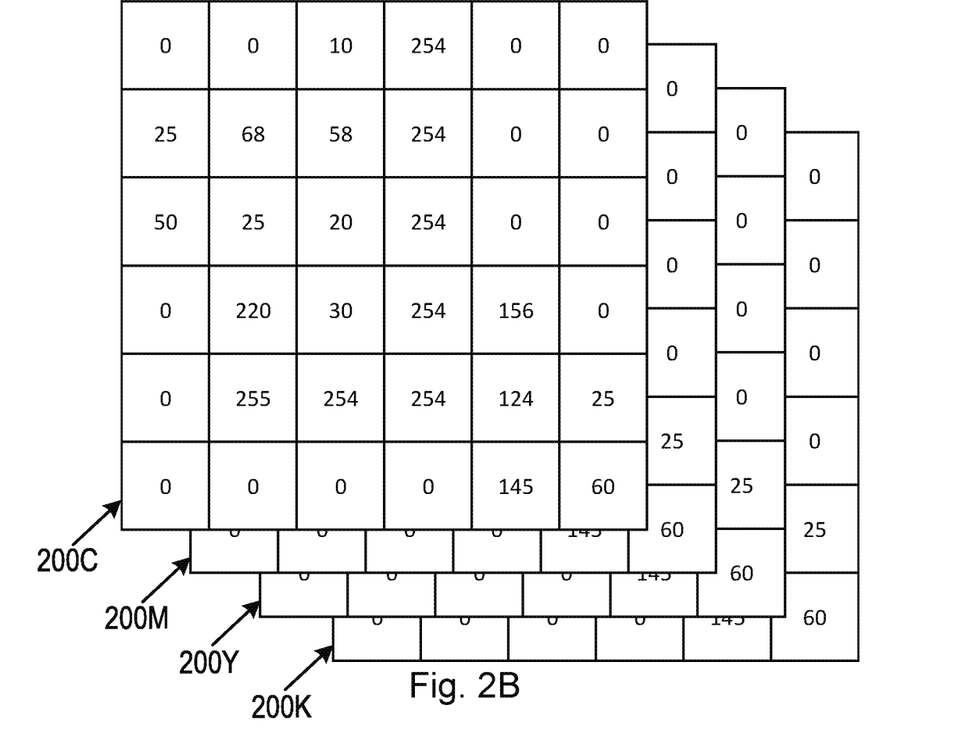

FIG. 2B shows four matrix representations, each of which corresponds to a different colorant—cyan (C), magenta (M), yellow (Y) and black (K), in this example. The matrix representations are labelled 200C, 200M, 200Y and 200K, respectively. In each matrix representation, the amount of the respective colorant to be delivered is represented numerically by a continuous tone value, or con-tone value, ranging from 0 to 255, and corresponding to the shading shown in the matrix representation 200 of FIG. 2A. Thus, the cells 202 of the matrix representation 200, where no colorant is to be delivered, are provided with a con-tone value 0; the cells 204, where a small amount of the colorant is to be delivered, are provided with a con-tone value 25; the cells 206, where a relatively larger amount of the colorant is to be delivered, are provided with a con-tone value 254; and the cell 208, where a large amount of the colorant is to be delivered, is provided with a con-tone value 255. In this example, for simplicity, the con-tone values for all four colorants are the same at each print addressable location. The con-tone values of FIG. 2B may be considered to be the colorant values referred to above. In a general sense, those values can be used to identify regions containing a boundary between a high-saturation location and a low-saturation location.

In some implementations, an approximate amount of treatment fluid (e.g. fixer) to be applied to each print addressable location may be determined as a proportion of the total amount of colorant to be delivered at corresponding print addressable location. This may be the case when no adjustments (according to the present disclosure) are made. For example, in a general case, an amount of treatment fluid to be delivered to a print addressable location may comprise 15% of the total amount of colorant (of all colors) that is to be delivered to that print addressable location. In other examples, the amount of treatment fluid to be delivered may be based on a different percentage of the total colorant amount. For example, the amount of treatment fluid may comprise between 10% and 20% of the total colorant amount. In general, a fluid value for a given print addressable location may comprise between 5% and 30% of a corresponding colorant value for the given address the location. Thus, to some extent, the amount of treatment fluid (e.g. fixer) to be applied to print addressable locations during a printing operation depends on the amount of colorant that is to be applied at the various print addressable locations. As noted above, however, print agent bleed (e.g. colorant bleed) may be more prominent at boundary regions between an area of high colorant saturation and an area of low colorant saturation, and it is these boundary regions that are identified at block 104 of the method 100.

Figure 2C:
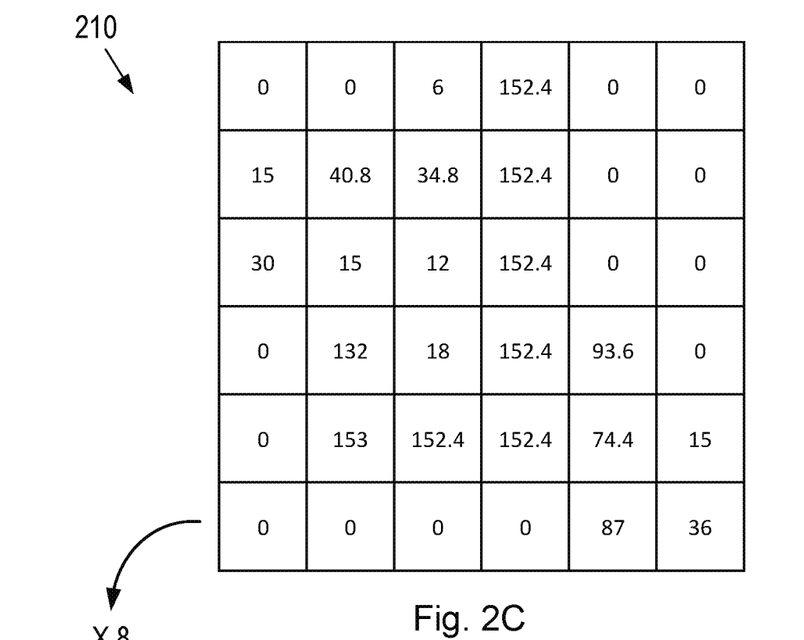

Examples described herein provide a mechanism by which the general amount, or base amount of treatment fluid that is to be delivered can be adjusted so that more treatment fluid is delivered in particular regions. An amount of treatment fluid to be delivered to a particular print addressable location may be defined in terms of a fluid value. Initial data may be obtained, acquired or calculated which comprises fluid values defining the base amount of treatment fluid to be delivered to a print addressable location. In the example below, a base amount of treatment fluid to be delivered is 15% of the total amount of colorant. The total amount of colorant may be determined by combining the con-tone values for all of the colorants at each print addressable location. FIG. 2C shows matrix representation 210 in which the value in each cell has been generated by calculating 15% of the sum of the con-tone values for the four colorants 200C, 200M, 200Y, 200K at the corresponding print addressable location. For example, cells in the matrix representation 210 corresponding to cells in the matrix representations 200C, 200M, 200Y, 200K in which the con-tone values are 25, are calculated as: value=15% (4×25)=15. These values may be considered to be initial values or base values contained within initial data.

In practice, the amount of treatment fluid (also referred to as additional print agent) to be delivered at each print addressable location may be defined in a separate matrix representation or plane, which may be referred to as a treatment fluid plane or a fixer plane. All of the planes (e.g. each colorant plane and the fixer plane) may be combined prior to being provided to a print apparatus to perform the printing operation. Thus, the matrix representation 210 may be referred to as a fixer plane. The con-tone values in the matrix 210 may be referred to a "fluid values", as they relate to an amount (e.g. a base amount) of treatment fluid or fixer to be delivered.

It is noted above that the colorant values may be used to determine boundary regions between high saturation and low saturations areas. Similarly, the adjusted con-tone values shown in FIG. 2C may be used to determine such boundary regions. However, to be used in a printing system, the con-tone values in the matrix representation are first to be converted into half-tone values. This may be done in various ways. In this example, half-tone values are assigned according to various ranges of con-tone values. Thus, a con-tone value of 0 is given a half-tone value of 0, a con-tone value in the range 1 to 86 is given a half-tone value of 1, a con-tone value in the range 87 to 170 is given a half-tone value of 2, and a con-tone value greater than or equal to 171 is given a half-tone value of 3. Once the colorant con-tone values have been converted into colorant half-tone values, the colorant half-tone values may be used by a printing apparatus to print an image according to the half-tone matrix representation. Thus, the colorant half-tone values may alternatively constitute or be referred to as colorant values.

In some examples (e.g. in the case of colorant half-tone values), each colorant value may represent a number of drops of the colorant to be delivered. Thus, if the colorant planes (e.g. the matrix representations 200C, 200M, 200Y, 200K of FIG. 2B are converted using the above conversion mechanism, then colorant values may be obtained that can be used during a printing operation. In that example, at print addressable locations where none of the colorant is to be delivered (i.e. cells 202), then a colorant value 0 may indicate that no colorant is to be delivered. Similarly, at print addressable locations where a large amount of the colorant is to be delivered (i.e. cell 208 in this example), then a current value 3 may indicate that 3 drops of the colorant are to be delivered at those print addressable locations. Colorant values 1 and 2 may correspond to one drop and two drops of colorant respectively.

Figure 2D:
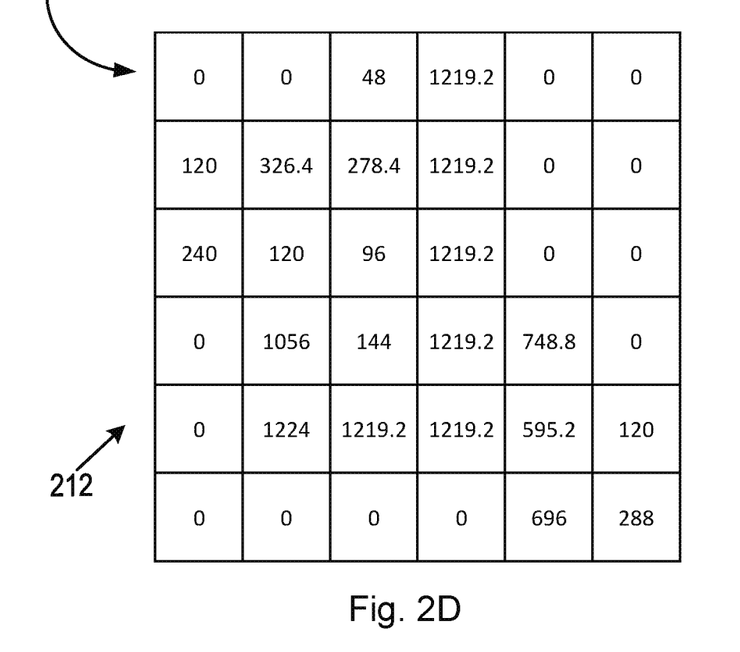

If the above conversion mechanism were applied to the con-tone values of FIG. 2C, the corresponding half-tone values would range from only 0 to 2, with no half-tone values of 3. Therefore, to increase the range of half-tone values, prior to applying conversion to the con-tone values, each con-tone value may be multiplied by a factor, N, to generate an adjusted con-tone value. Here, N>1, and may be an integer. By multiplying each fluid value by a number, N, the value of each non-zero fluid value increases, and increased the range of half-tone values that appear in the matrix representation. Thus, it becomes easier to identify boundary regions between an area of high treatment fluid saturation (or high colorant saturation) and an area of low treatment fluid saturation (or low colorant saturation). FIG. 2D shows a matrix representation 212 in which the original half-tone values have been multiplied by the factor N=8.

Figure 2E:
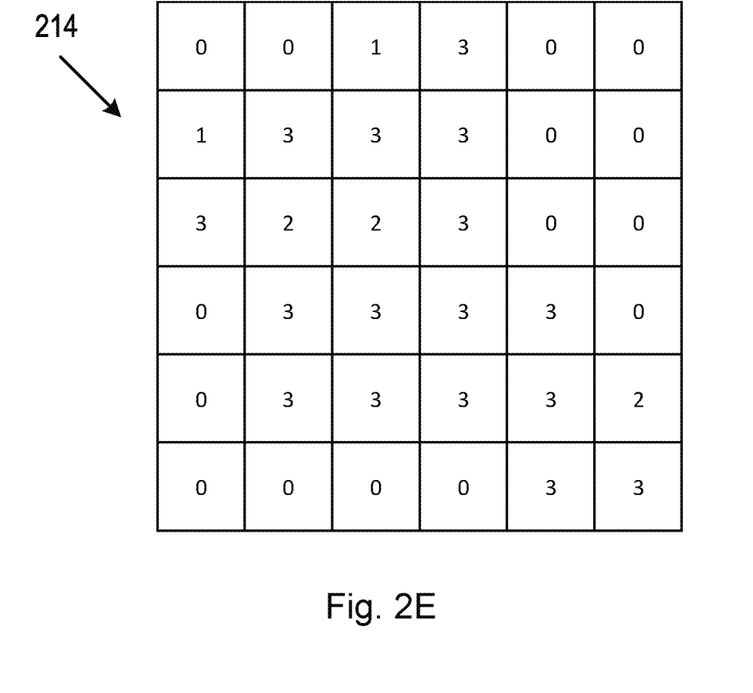

Applying the conversion mechanism discussed above to the new, inflated half-tone values of FIG. 2D renders a matrix representation 214, as shown in FIG. 2E, which includes half-tone values ranging from 0 to 3. The values in the matrix 214 may be referred to as fluid values in cases where the con-tone values have been converted to half-tone values.

As noted above, method 100 may seek to identify those adjacent print addressable locations whose respective colorant values differ by a large amount. Thus, referring again to the example shown in FIG. 2C, in its most general sense, the method 100 may seek to identify adjacent print addressable locations whose respective colorant values differ by at least 75, for example, and determining that additional treatment fluid is to be delivered at those locations. However, an even more improved method of determining where an increased amount of treatment fluid is to be delivered can be achieved by performing a process that may be referred to as "blooming" which is discussed below with reference to FIG. 3.

Figure 3:
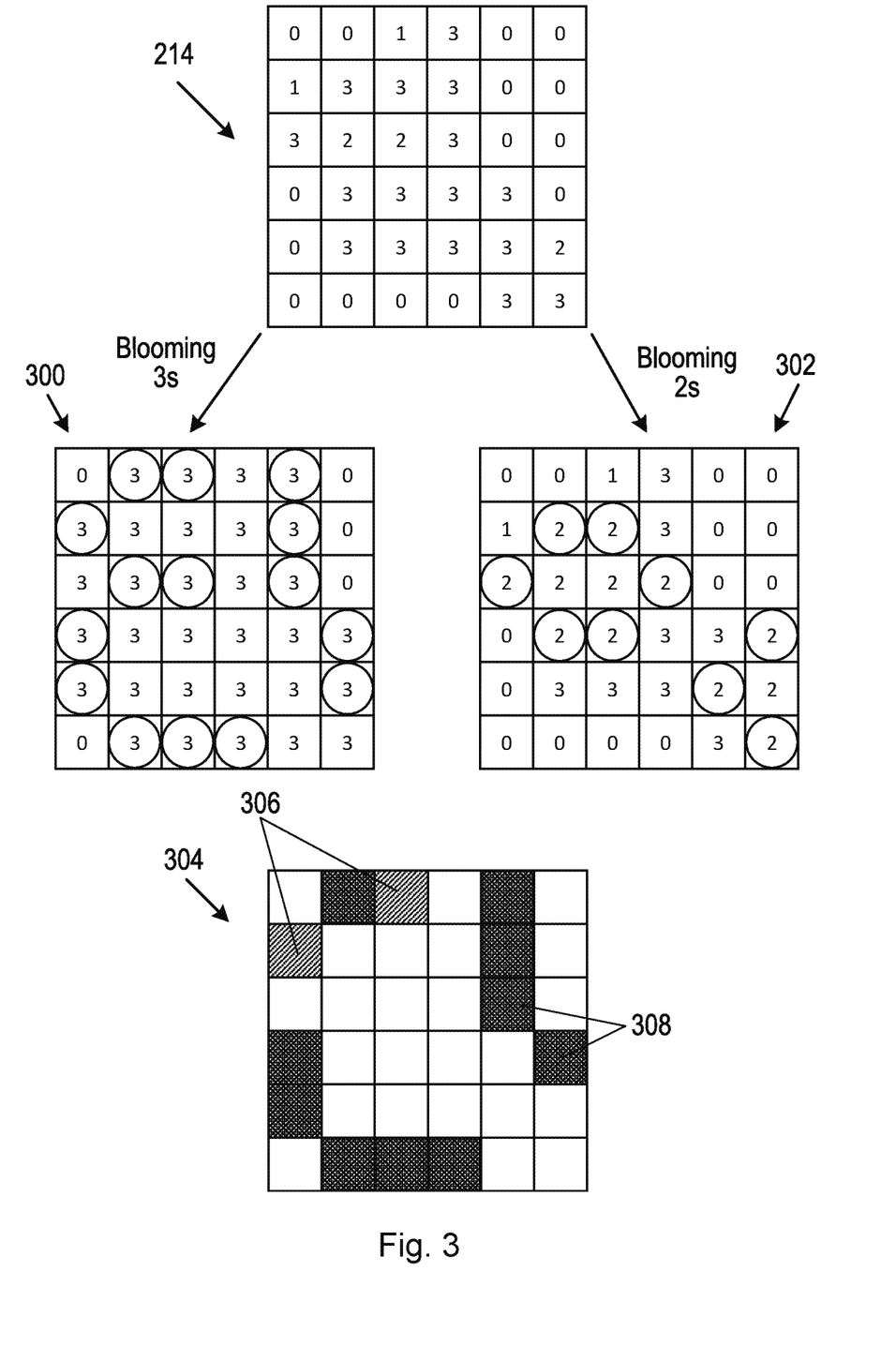
FIG. 3 is an illustration of various matrices showing various parts of the methods disclosed herein according to some examples.

FIG. 3 is an illustration of the matrix representation 214 at various stages during a "blooming" process, which is discussed below. The determinations made during the blooming process may be made in a plane different to the colorant planes and the fixer plane. In some examples, such a plane may be referred to as a "blooming plane". Multiple planes are used so that information (e.g. in the colorant planes or in the fixer plane is not lost and can, therefore, be used during a printing operation in addition information determined in the blooming plane.

Figure 4:
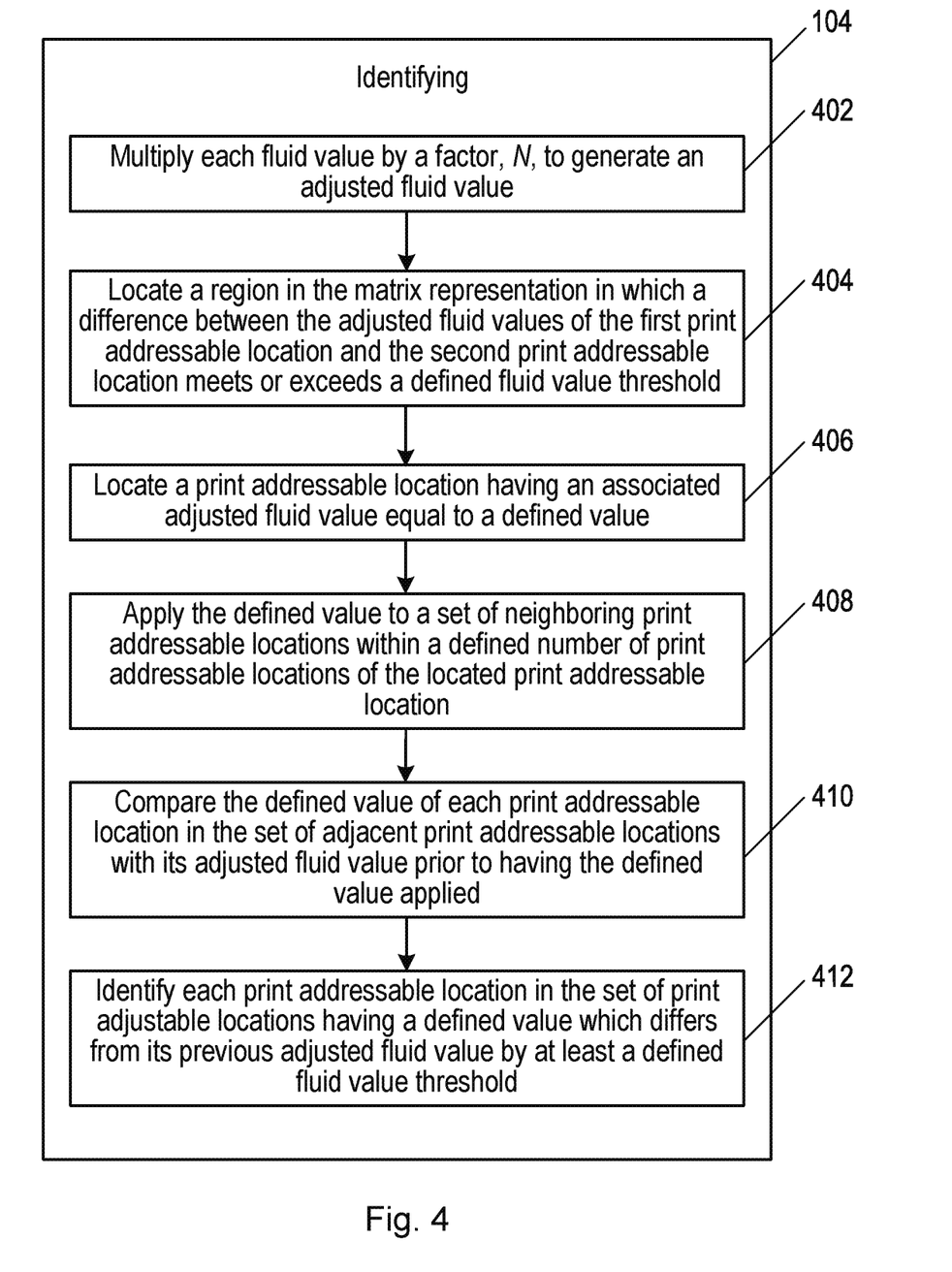
FIG. 4 is a flowchart of a further example of a method of determining printing fluid amounts.

The blooming process may form part of the identifying performed at block 104, and is discussed below with reference to FIG. 3 and FIG. 4. FIG. 4 is a flowchart of a further example of a method, such as a method of determining print agent amounts, or of determining treatment fluid amounts. Specifically, FIG. 4 is a flowchart describing how the identifying of block 104 may be performed according to a particular example.

At block 402, the identifying (block 104) may comprise multiplying each fluid value (e.g. each half-tone value of the matrices of FIG. 2B) by a factor, N, to generate an adjusted fluid value, as discussed above with reference to FIG. 2. As noted previously, N>1, and may be an integer, and in some examples, N=8. In such examples, the adjusted fluid value at each print addressable location is, effectively, 120% of the total corresponding half-tone value in the colorant plane at that print addressable location. In other examples, a different value of N may be used.

The identifying (block 104) may further comprise, at block 404, locating a region in the matrix representation in which a difference between the adjusted fluid values of the first print addressable location and the second print addressable location meets or exceeds a defined fluid value threshold. Thus, similarly to the discussion above with regard to the colorant plane, when the fixer plane (e.g. the matrix 210 of FIG. 2C or the matrix 212 of FIG. 2D) is used, regions may be located in which the adjusted fluid value of the first print addressable location differs from the adjusted fluid value of the second print addressable location by at least a defined fluid value threshold. While locating regions using the fixer plane may give suitable results (i.e. a suitable location where additional treatment fluid is to be delivered), a more robust approach may be used using the blooming process, as described below.

The blooming process may be used to identify a print addressable location that has nearby print addressable locations with significantly different adjusted fluid values (e.g. where the difference between the adjusted fluid values is greater than the defined fluid value threshold). To achieve this, the identifying (of block 104) may further comprise, at block 406, locating a print addressable location having an associated adjusted fluid value equal to a defined value. For example, starting with the matrix representation 214 of FIG. 3, a print addressable location having an adjusted fluid value equal to 3 may be located. The blooming process may involve looking at print addressable locations within a defined number of print addressable locations (e.g. within 1, 2, 3 or 4 locations) of the located print addressable location that has the adjusted fluid value of 3. The blooming process effectively expands the number of print addressable locations that are analyzed, from just those locations adjacent to the print addressable location that has the adjusted value of 3 to other print addressable locations further afield.

The identifying (of block 104) may further comprise, at block 408, applying the defined value to a set of neighboring print addressable locations within a defined number of print addressable locations of the located print addressable location. In FIG. 3, the matrix representation 300 shows the effect of applying the defined value 3 to print addressable locations neighboring each print addressable location that has the defined value 3 in the matrix representation 214. In other words, the print addressable locations having an adjusted fluid value of 3 are "bloomed" by one location in this example. In this example, the blooming is performed just to locations that are adjacent to the sides of the cells of the matrix, while in other examples, the blooming may be extended in diagonal directions. In the matrix representation 300, each cell to which the defined value (i.e. 3) has been applied is shown with a ring.

The blooming process may also be performed for other defined values. For example, in FIG. 3, the matrix representation 302 shows the effect of applying the defined value 3 to print addressable locations neighboring each print addressable location that has the defined value 2 in the matrix representation 214. In other words, the print addressable locations having an adjusted fluid value of 2 are "bloomed" by one location in this example. In the matrix representation 302, each cell to which the defined value (i.e. 2) has been applied is shown with a ring.

The identifying (of block 104) may further comprise, at block 410, comparing the defined value of each print addressable location in the set of adjacent print addressable locations with its adjusted fluid value prior to having the defined value applied.

In other words, a comparison is made of the ringed values in the matrix representations 300 and 302 with the respective values in the matrix representation 214.

The identifying (of block 104) may then further comprise, at block 412, identifying each print addressable location in the set of print adjustable locations having a defined value which differs from its previous adjusted fluid value by at least a defined fluid value threshold. The defined fluid value threshold may, for example, be defined as 2. In this example, the identifying (block 412) results in the identification of any of the ringed cells of the matrix representation 300 whose previous values were 0 or 1, and further results in the identification of any of the ringed cells of the matrix representation 302 whose previous values were 0. By performing the blooming process, as exemplified above, the method is able to identify print addressable locations that may be affected by print agent bleed.

Once the locations have been identified at block 412, an amount of print agent to be delivered can be determined. Thus, the determining (block 106) of an amount of treatment fluid to be delivered may comprise determining that an amount of treatment fluid to be delivered to the identified print addressable location in the set of print adjustable locations is greater than the amount of treatment fluid defined in the initial data. The exact amount of treatment fluid to be delivered may, in some examples, be determined based on the nature of the printing operation to be performed (e.g. based on the colorants and/or the treatment fluid to be used). Such decisions may be made with the assistance of an operator or engineer. However, the methods described herein enable the identification, at the half-toning stage, prior to the stark of any printing operation, of areas where print agent bleed is most likely to take place.

The matrix representation 304 in FIG. 3 shows which print addressable locations are identified as a result of the blooming process where additional treatment fluid is to be delivered. In the matrix representation 304, locations 306 where a difference between the initial fluid values and the 'post-blooming' fluid vales is 2 are shown with light shading. Those locations represent a relatively small difference in saturation levels, so it may be determined that a small amount of additional treatment fluid is to be delivered. Locations 308 where a difference between the initial fluid values and the 'post-blooming' fluid vales is 3 are shown with dark shading. Those locations represent a relatively large difference in saturation levels, so it may be determined that a large amount of additional treatment fluid is to be delivered.

In any of the examples disclosed herein, the amount of treatment fluid that it is determined is to be delivered during the printing process may vary according to the difference between the fluid values at adjacent (or nearby) print addressable locations. For example, where there exists a large difference in fluid values between adjacent print addressable locations (e.g. where one location has a value 3 and an adjacent location has the value 0), a relatively larger amount of treatment fluid may be delivered compared to adjacent print addressable locations where there exists a smaller difference in fluid values (e.g. where one location has a value 3 and an adjacent location has the value 1). Thus, said determining may comprise determining that a first amount of treatment fluid is to be delivered to a print addressable location in the identified region if the difference between colorant values of the first print addressable location and the second print addressable location meets or exceeds a first defined colorant threshold (or first defined fluid threshold) (e.g. 2), and that a second, larger amount of treatment fluid is to be delivered to a print addressable location in the identified region if the difference between colorant values of the first print addressable location and the second print addressable location meets or exceeds a second, larger defined colorant threshold (or second defined fluid threshold) (e.g. 3).

Figure 5:
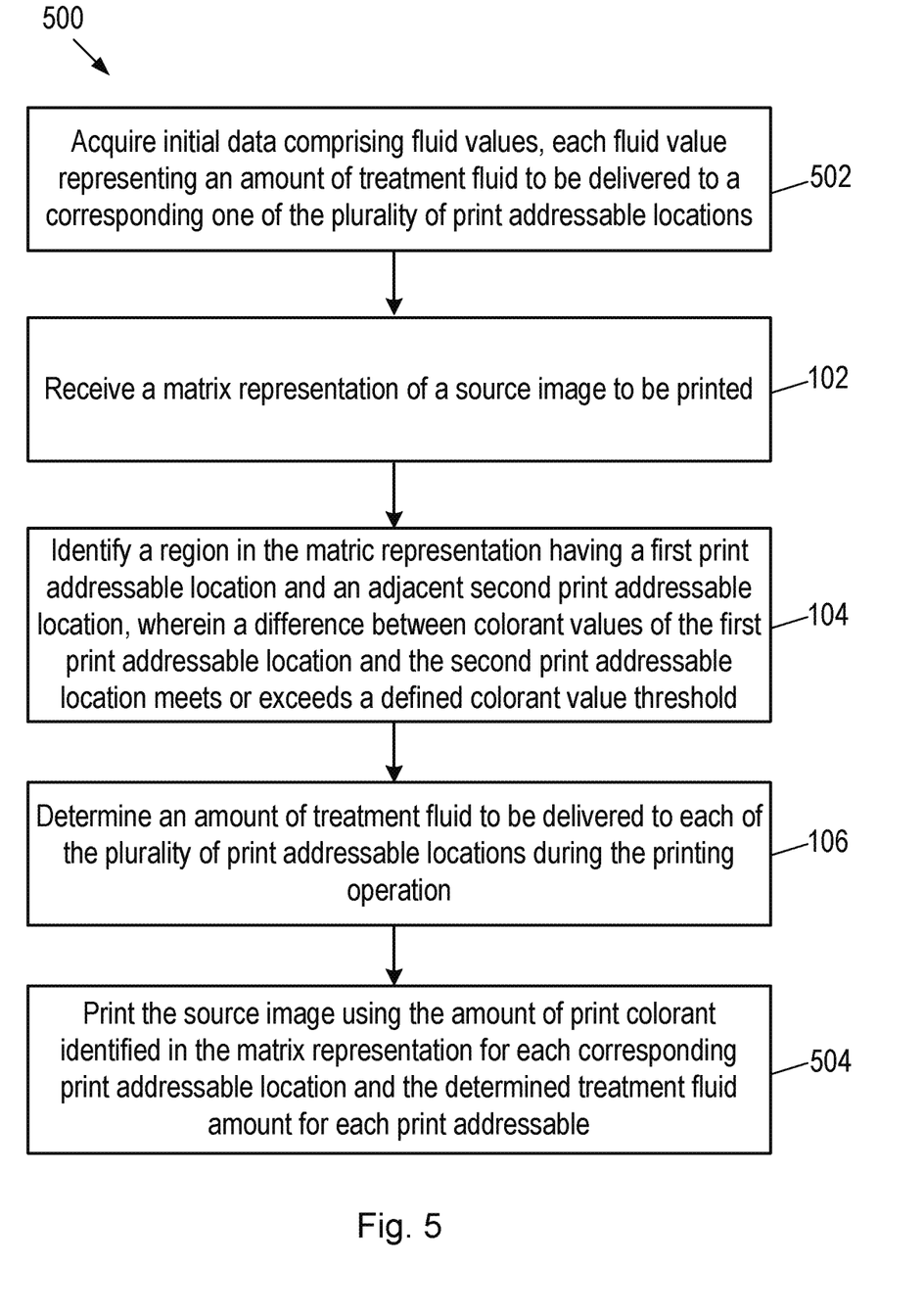
FIG. 5 is a flowchart of a further example of a method of determining printing fluid amounts.

FIG. 5 is a flowchart of a further example of a method 500, such as a method of determining print agent amounts, or of determining treatment fluid amounts. The method 500 may comprise blocks of the method 100 discussed above. At block 502, the method 500 may comprise acquiring initial data comprising fluid values, each fluid value representing an amount of treatment fluid to be delivered to a corresponding one of the plurality of print addressable locations. The fluid values defined in the initial data may comprise the initial fluid values described above. The initial values may, for example, be acquired from a database stored in a storage device, or may be determined based on the amount of colorant to be delivered during the printing operation. When initial data defining the initial fluid values is acquired or determined, the determining of block 106 may comprise modifying the initial data (e.g. the initial fluid values) for a print addressable locations in the identified region. In some examples, the initial data for more than one of the print addressable locations may be modified at block 106. Thus, once the amount of treatment fluid to be delivered at a print addressable location has been determined, the initial data defining an initial amount of treatment fluid to be delivered may be adjusted or modified.

The method 500 may comprise, at block 504, printing the source image using the amount of print colorant identified in the matrix representation for each corresponding print addressable location and the determined treatment fluid amount for each print addressable location. The source image may be printed using a print apparatus associated with the processing apparatus to perform the methods disclosed herein.

Figure 6:
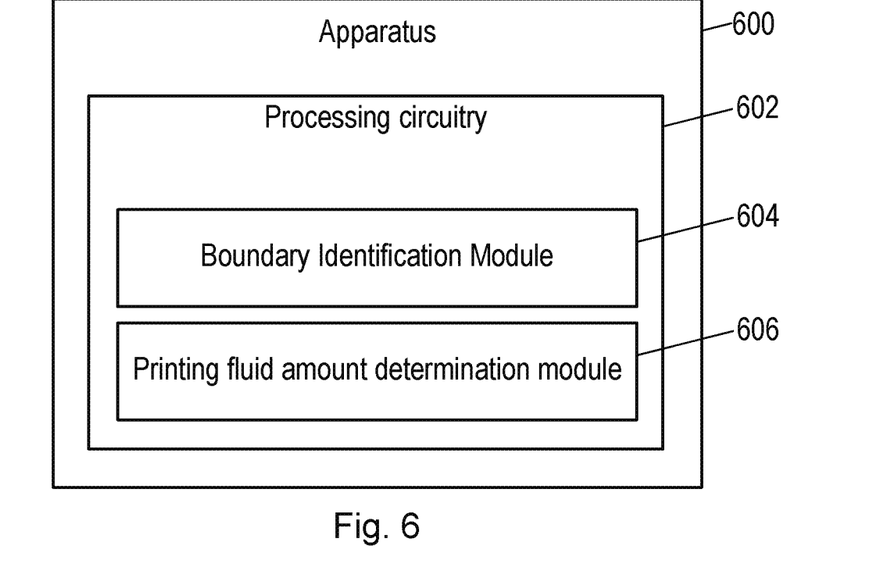
FIG. 6 is a schematic illustration of an apparatus for determining printing fluid amounts.

Examples of the present disclosure also provide an apparatus. FIG. 6 is a schematic illustration of an example of an apparatus 600, such as an apparatus for determining print agent amounts, or determining treatment fluid amounts. The apparatus 600 comprises processing circuitry 602. The processing circuitry 602 comprises a boundary identification module 604 and a printing fluid amount determining module 606. The boundary identification module 604 is to identify, in a matrix representation of an image to be printed, a region having a first print addressable location having an associated first colorant value representative of an amount of colorant to be delivered to the first print addressable location and an adjacent second print addressable location having an associated second colorant value representative of an amount of colorant to be delivered to the second print addressable location. A difference between the first colorant value and the second colorant value meets or exceeds a defined threshold difference. In some examples, the boundary identification module 604 may be considered to perform functions described in block 104 of the method 100.

The printing fluid amount determining module 606 is to determine an amount of printing fluid to be delivered during a printing operation to print the image. The printing fluid amount determination module 606 is to determine that an amount of printing fluid to be delivered within the identified region is greater than an amount of printing fluid to be delivered to adjacent print addressable locations having colorant values which differ by less than the defined threshold difference. In some examples, the printing fluid amount determination module 606 may be considered to perform functions described in block 106 of the method 100. The printing fluid may comprise treatment fluid (e.g. fixer) as discussed herein.

The apparatus 600 may, in some examples, also comprise a module (e.g. an image receiving module, not shown) to receive data representing a source image to be printed, and/or a matrix representation of a source image to be printed. In some examples, the apparatus may comprise a module to convert a con-tone version of the source image into a half-tone version of the source image.

In some examples, the printing fluid amount determination module 606 may determine that an amount of printing fluid to be delivered to the print addressable location of the first and second print addressable locations which has a relatively lower colorant value is greater than an amount of printing fluid to be delivered to the print addressable location of the first and second print addressable locations which has a relatively higher colorant value. Thus, additional printing fluid (e.g. treatment fluid) is to be delivered to the print addressable location with the lower colorant value in an adjacent pair of print addressable locations within a high-saturation to low-saturation region.

Figure 7:
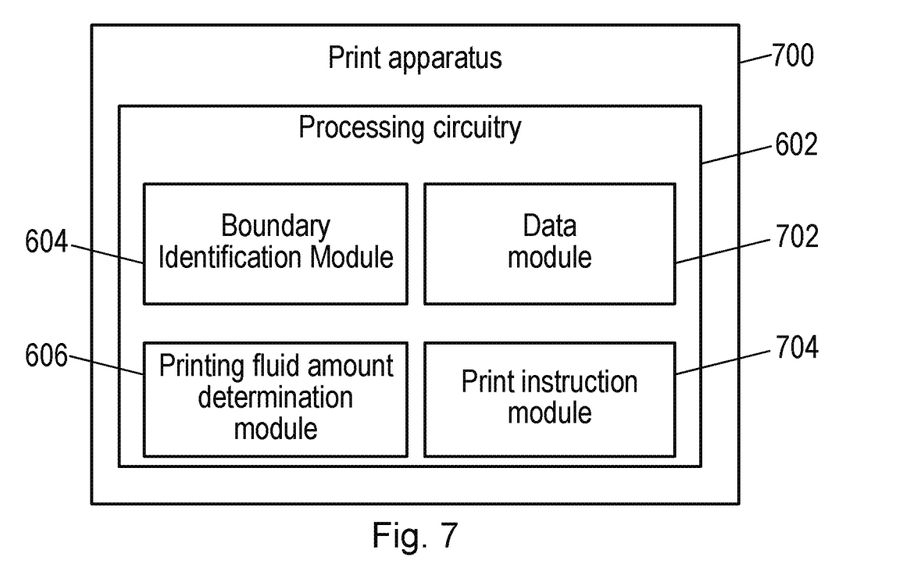
FIG. 7 is a schematic illustration of a print apparatus.

FIG. 7 is a schematic illustration of a further example of an apparatus 700, such as an apparatus for determining print agent amounts, or determining treatment fluid amounts. The apparatus 700 may comprise the processing circuitry 602 of the apparatus 600, and the processing circuitry may comprise the boundary identification module 604 and the printing fluid amount determining module 606 discussed above. The processing circuitry 602 may further comprise a data module 702 to acquire data representing the matrix representation of the image to be printed. The processing circuitry 602 may further comprise a print instruction module 704 to determine print instructions based on the acquired data, and using the determined amounts of print fluid. The print instruction module 704 may, for example, determine print instructions based further on the colorant values defined in the matrix representation.

In some examples, the apparatus 700 may comprise a print apparatus. Such print apparatus may print an image according to the determined print instructions. In other words, the print apparatus may deliver printing agent (e.g. print colorant and treatment fluid) in accordance with the print instructions, in order to form or generate the image.

Figure 8:
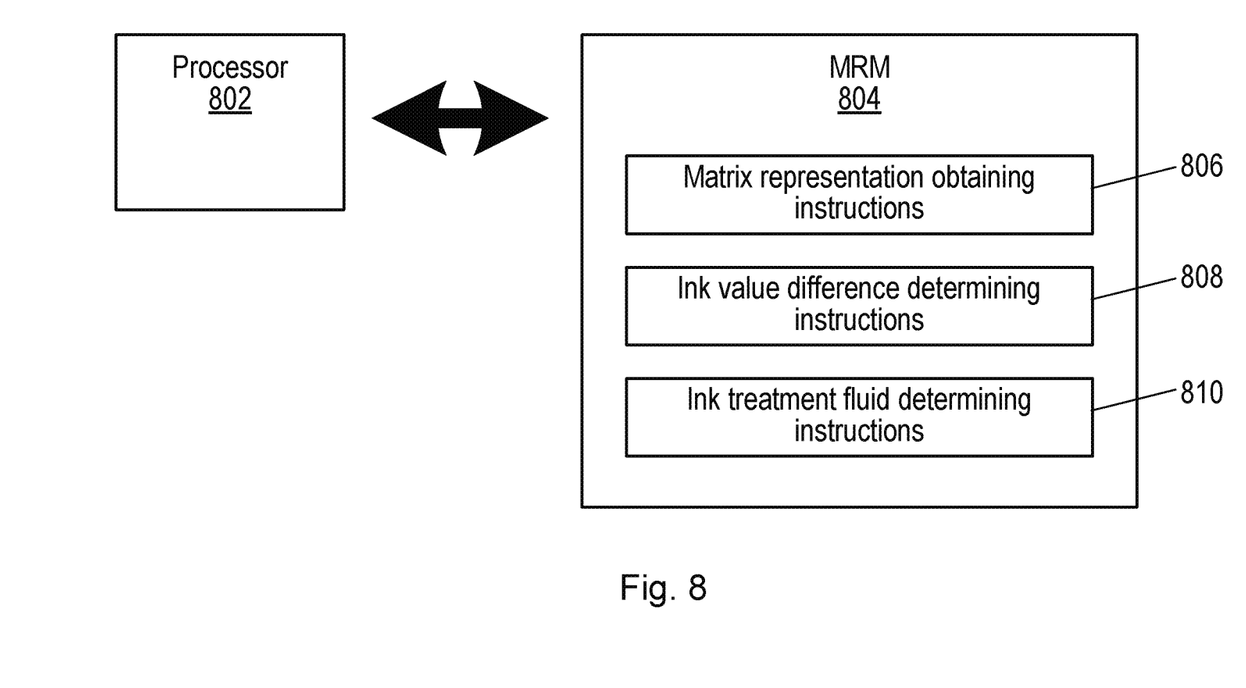
FIG. 8 is a schematic illustration of a machine-readable medium in communication with a processor.

The present disclosure also provides a machine-readable medium. FIG. 8 is a schematic illustration of a machine-readable medium 804 in communication with a processor 802. The machine-readable medium 804 comprises instructions which, when executed by a processor 802, cause the processor to perform functions, such as those described herein. In some examples, instructions may cause the processor 802 to perform blocks of the method 100, 500 described above. The machine-readable medium 804 may comprise instructions (e.g. matrix representation obtaining instructions 806) which, when executed by 802 processor, cause the processor to obtain a matrix representation defining an ink value for each of a plurality of print addressable locations representative of pixels of an image to be printed during a printing operation, wherein each ink value is representative of an amount of ink to be delivered to a corresponding print addressable location during the printing operation. The term "ink value" may be considered to have the same meaning as "colorant value". The machine-readable medium 804 may comprise instructions (e.g. ink value difference determining instructions 808) which, when executed by 802 processor, cause the processor to determine that the ink value of a first print addressable location differs from the ink value of an adjacent second print addressable location by at least a defined threshold difference. The machine-readable medium 804 may comprise instructions (e.g. ink treatment fluid determining instructions 810) which, when executed by 802 processor, cause the processor to determine an amount of ink treatment fluid to be delivered to each of the plurality of print addressable locations during the printing operation, wherein an amount of ink treatment fluid to be delivered to the first print addressable location and the second print addressable location is determined to be greater than an amount of ink treatment fluid to be delivered to adjacent print addressable locations having ink values which differ by less than the defined threshold difference.

In some examples, the instructions (e.g. instructions 810) that cause the processor 802 to determine an amount of ink treatment fluid to be delivered cause the processor to determine that a relatively larger amount of printing fluid is to be delivered to the print addressable location of the first and second print addressable locations which has a relatively lower ink value.

Examples disclosed herein provide a mechanism whereby a matrix representation of an image to be printed can be analyzed and, within regions that are identified as being boundary regions between areas of high colorant/treatment fluid-saturation and low colorant/treatment fluid-saturation, it can be arranged/planned that additional treatment fluid is to be delivered to help reduce the amount of colorant bleed that occurs in the printed image. Specifically, by using a "blooming" process, whereby print addressable locations that are near to, and not just adjacent to, such boundary regions are assessed, to achieve more thorough application of treatment fluid, in areas where print agent bleed is most likely to occur. By using the techniques described herein, effective reduction in print agent bleed can be achieved, while reducing unnecessary application of treatment fluid in areas where the risk of print agent bleed is low.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving a matrix representation of a source image to be printed, the matrix representation defining a colorant value for each of a plurality of print addressable locations, wherein the colorant values are representative of amounts of print colorant to be delivered to the print addressable locations during a printing operation;
   identifying, by processing circuitry, a region in the matrix representation having a first print addressable location and an adjacent second print addressable location, wherein a difference between colorant values of the first print addressable location and the second print addressable location meets or exceeds a defined colorant value threshold; and
   determining, by processing circuitry, an amount of treatment fluid to be delivered to each of the plurality of print addressable locations during the printing operation, wherein an amount of treatment fluid to be delivered in the identified region is determined to be greater than an amount of treatment fluid to be delivered to adjacent print addressable locations having colorant values which differ by less than the defined colorant value threshold.

2. A method according to claim 1, wherein said determining comprises determining that an amount of treatment fluid to be delivered to the print addressable location in the identified region that has a relatively lower colorant value is greater than an amount of treatment fluid to be delivered to the print addressable location in the identified region that has a relatively higher colorant value.

3. A method according to claim 1, further comprising:
   acquiring initial data comprising fluid values, each fluid value representing an amount of treatment fluid to be delivered to a corresponding one of the plurality of print addressable locations;
   wherein said determining comprises modifying the initial data for a print addressable locations in the identified region.

4. A method according to claim 3, wherein said identifying comprises:
   multiplying each fluid value by a factor, N, to generate an adjusted fluid value; and
   locating a region in the matrix representation in which a difference between the adjusted fluid values of the first print addressable location and the second print addressable location meets or exceeds a defined fluid value threshold.

5. A method according to claim 4, wherein said identifying further comprises:
   locating a print addressable location having an associated adjusted fluid value equal to a defined value;
   applying the defined value to a set of neighboring print addressable locations within a defined number of print addressable locations of the located print addressable location;
   comparing the defined value of each print addressable location in the set of adjacent print addressable locations with its adjusted fluid value prior to having the defined value applied; and
   identifying each print addressable location in the set of print adjustable locations having a defined value which differs from its previous adjusted fluid value by at least a defined fluid value threshold;
   wherein said determining an amount of treatment fluid to be delivered comprises determining that an amount of treatment fluid to be delivered to the identified print addressable location in the set of print adjustable locations is greater than the amount of treatment fluid defined in the initial data.

6. A method according to claim 3, wherein a fluid value for a given print addressable location comprises between 5% and 30% of a corresponding colorant value for the given print addressable location.

7. A method according to claim 1, wherein said determining comprises determining that a first amount of treatment fluid is to be delivered to a print addressable location in the identified region if the difference between colorant values of the first print addressable location and the second print addressable location meets or exceeds a first defined colorant threshold, and that a second, larger amount of treatment fluid is to be delivered to a print addressable location in the identified region if the difference between colorant values of the first print addressable location and the second print addressable location meets or exceeds a second, larger defined colorant threshold.

8. A method according to claim 1, further comprising:
   printing the source image using the amount of print colorant identified in the matrix representation for each corresponding print addressable location and the determined treatment fluid amount for each print addressable location.

9. A method according to claim 1, wherein the matrix representation comprises a halftone representation, and wherein the colorant values comprise halftone values.

10. An apparatus, comprising:
    processing circuitry comprising:
    a boundary identification module to identify, in a matrix representation of an image to be printed, a region having a first print addressable location having an associated first colorant value representative of an amount of colorant to be delivered to the first print addressable location and an adjacent second print addressable location having an associated second colorant value representative of an amount of colorant to be delivered to the second print addressable location, wherein a difference between the first colorant value and the second colorant value meets or exceeds a defined threshold difference; and
    a printing fluid amount determination module to determine an amount of printing fluid to be delivered during a printing operation to print the image, wherein the printing fluid amount determination module is to determine that an amount of printing fluid to be delivered within the identified region is greater than an amount of printing fluid to be delivered to adjacent print addressable locations having colorant values which differ by less than the defined threshold difference.

11. An apparatus according to claim 10, wherein the printing fluid amount determination module is to determine that an amount of printing fluid to be delivered to the print addressable location of the first and second print addressable locations which has a relatively lower colorant value is greater than an amount of printing fluid to be delivered to the print addressable location of the first and second print addressable locations which has a relatively higher colorant value.

12. An apparatus according to claim 10, wherein the processing circuitry further comprises:
   a data module to acquire data representing the matrix representation of the image to be printed; and
   a print instruction module to determine print instructions based on the acquired data, and using the determined amounts of print fluid.

13. An apparatus according to claim 12, further comprising:
   print apparatus to print an image according to the determined print instructions.

14. A machine-readable medium comprising instructions which, when executed by a processor, cause the processor to:
   obtain a matrix representation defining an ink value for each of a plurality of print addressable locations representative of pixels of an image to be printed during a printing operation, wherein each ink value is representative of an amount of ink to be delivered to a corresponding print addressable location during the printing operation;
   determine that the ink value of a first print addressable location differs from the ink value of an adjacent second print addressable location by at least a defined threshold difference; and
   determine an amount of ink treatment fluid to be delivered to each of the plurality of print addressable locations during the printing operation, wherein an amount of ink treatment fluid to be delivered to the first print addressable location and the second print addressable location is determined to be greater than an amount of ink treatment fluid to be delivered to adjacent print addressable locations having ink values which differ by less than the defined threshold difference.

15. A machine-readable medium according to claim 14, wherein the instructions that cause the processor to determine an amount of ink treatment fluid to be delivered cause the processor to determine that a relatively larger amount of printing fluid is to be delivered to the print addressable location of the first and second print addressable locations which has a relatively lower ink value.

* * * * *